United States Patent
Johansen

(10) Patent No.: US 10,109,096 B2
(45) Date of Patent: *Oct. 23, 2018

(54) FACILITATING DYNAMIC ACROSS-NETWORK LOCATION DETERMINATION USING AUGMENTED REALITY DISPLAY DEVICES

(71) Applicant: Bank of America Corporation, Charlotte, NC (US)

(72) Inventor: Joseph N. Johansen, Rock Hill, SC (US)

(73) Assignee: Bank of America Corporation, Charlotte, NC (US)

(*) Notice: Subject to any disclaimer, the term of this patent is extended or adjusted under 35 U.S.C. 154(b) by 29 days.

This patent is subject to a terminal disclaimer.

(21) Appl. No.: 15/372,964

(22) Filed: Dec. 8, 2016

(65) Prior Publication Data

US 2018/0165849 A1   Jun. 14, 2018

(51) Int. Cl.
| | |
|---|---|
| *G06T 11/60* | (2006.01) |
| *G06F 3/01* | (2006.01) |
| *G06K 9/00* | (2006.01) |
| *H04L 29/08* | (2006.01) |
| *G06Q 10/10* | (2012.01) |

(52) U.S. Cl.
CPC .............. *G06T 11/60* (2013.01); *G06F 3/011* (2013.01); *G06F 3/017* (2013.01); *G06K 9/00288* (2013.01); *G06Q 10/10* (2013.01); *H04L 67/18* (2013.01); *G05B 2219/32014* (2013.01)

(58) Field of Classification Search
CPC ......... G06T 11/60; G06Q 10/10; H04L 67/18; G06K 9/00288; G06F 3/011; G06F 3/017; G05B 2219/32014
See application file for complete search history.

(56) References Cited

U.S. PATENT DOCUMENTS

| | | |
|---|---|---|
| 5,999,944 A | 12/1999 | Lipkin |
| 6,408,257 B1 | 6/2002 | Harrington et al. |
| 6,602,075 B2 | 8/2003 | Adams |
| 6,602,076 B2 | 8/2003 | Adams |
| 6,625,299 B1 | 9/2003 | Meisner et al. |
| 6,871,140 B1 | 3/2005 | Florance et al. |
| 6,941,001 B1 | 9/2005 | Bolle et al. |
| 7,099,850 B1 | 8/2006 | Mann, II et al. |

(Continued)

FOREIGN PATENT DOCUMENTS

CN          103635920 A       3/2014

OTHER PUBLICATIONS

Saettler, M., "Westpac integrates augmented reality into bank account management," http://www.mobilecommercedaily.com/westpac-integrates-augmented-reality-into-bank-account-management, Aug. 6, 2014, 8 pages.

(Continued)

*Primary Examiner* — Maurice L. McDowell, Jr.
(74) *Attorney, Agent, or Firm* — Michael A. Springs

(57) ABSTRACT

An augmented reality system includes a central server, a local server an augmented reality user device. The central server includes account information for a customer and institution information. The institution information includes employee specialty data and employee office data. The local server includes location information for the customer and a plurality of employees. The augmented reality user device displays account information and displays a location of one of the employees.

20 Claims, 6 Drawing Sheets

(56) References Cited

U.S. PATENT DOCUMENTS

| | | |
|---|---|---|
| 7,392,208 B2 | 6/2008 | Morse et al. |
| 7,680,694 B2 | 3/2010 | Glazer et al. |
| 7,817,104 B2 | 10/2010 | Ryu et al. |
| 7,831,471 B2 | 11/2010 | Adams |
| 7,834,883 B2 | 11/2010 | Adams |
| 8,069,095 B2 | 11/2011 | Glazer et al. |
| 8,165,924 B2 | 4/2012 | Smyers et al. |
| 8,285,638 B2 | 10/2012 | Jung et al. |
| 8,326,704 B2 | 12/2012 | Glazer et al. |
| 8,396,738 B1 | 3/2013 | Allan et al. |
| 8,417,625 B2 | 4/2013 | Bannerjee et al. |
| 8,433,650 B1 | 4/2013 | Thomas |
| 8,438,001 B2 | 5/2013 | Natarajan et al. |
| 8,438,110 B2 | 5/2013 | Calman et al. |
| 8,442,295 B2 | 5/2013 | Sam |
| 8,442,906 B1 | 5/2013 | Thomas |
| 8,451,266 B2 | 5/2013 | Hertenstein |
| 8,577,803 B2 | 11/2013 | Chatterjee et al. |
| 8,589,255 B2 | 11/2013 | Glazer et al. |
| 8,601,386 B2 | 12/2013 | Altberg et al. |
| 8,611,601 B2 | 12/2013 | Calman et al. |
| 8,612,363 B2 | 12/2013 | Karkanias et al. |
| 8,635,104 B2 | 1/2014 | Adams |
| 8,660,951 B2 | 2/2014 | Calman et al. |
| 8,688,594 B2 | 4/2014 | Thomas et al. |
| 8,718,612 B2 | 5/2014 | Gelman et al. |
| 8,743,145 B1 | 6/2014 | Price |
| 8,803,916 B1 | 8/2014 | Paczkowski et al. |
| 8,805,739 B2 | 8/2014 | Brown et al. |
| 8,810,599 B1 | 8/2014 | Tseng |
| 8,890,896 B1 | 11/2014 | Tseng |
| 8,929,591 B2 | 1/2015 | Calman et al. |
| 8,990,914 B2 | 3/2015 | Da Cruz Pinto et al. |
| 9,007,473 B1 | 4/2015 | Worley, III et al. |
| 9,026,486 B2 | 5/2015 | Doorhy et al. |
| 9,044,673 B1 | 6/2015 | Ahuja et al. |
| 9,047,636 B2 | 6/2015 | Ross |
| 9,066,200 B1 | 6/2015 | Loxam et al. |
| 9,082,149 B2 | 7/2015 | Argue et al. |
| 9,092,600 B2 | 7/2015 | Scavezze et al. |
| 9,092,898 B1 | 7/2015 | Fraccaroli et al. |
| 9,100,493 B1 | 8/2015 | Zhou et al. |
| 9,105,013 B2 | 8/2015 | Chavez |
| 9,111,383 B2 | 8/2015 | Fein et al. |
| 9,153,074 B2 | 10/2015 | Zhou et al. |
| 9,223,950 B2 | 12/2015 | Li et al. |
| 9,230,367 B2 | 1/2016 | Stroila |
| 9,251,504 B2 | 2/2016 | Chavez |
| 9,317,860 B2 | 4/2016 | Calman et al. |
| 9,331,969 B2 | 5/2016 | Barak et al. |
| 9,338,589 B2 | 5/2016 | Loxam et al. |
| 9,342,928 B2 | 5/2016 | Rasane et al. |
| 9,349,118 B2 | 5/2016 | Chavez |
| 9,355,123 B2 | 5/2016 | Wnuk et al. |
| 9,367,878 B2 | 6/2016 | Rao |
| 2002/0044152 A1 | 4/2002 | Abbott, III et al. |
| 2010/0238161 A1 | 9/2010 | Varga et al. |
| 2011/0134108 A1 | 6/2011 | Hertenstein |
| 2012/0156668 A1 | 6/2012 | Zelin |
| 2012/0232966 A1 | 9/2012 | Calman et al. |
| 2012/0232968 A1 | 9/2012 | Calman et al. |
| 2012/0232976 A1 | 9/2012 | Calman et al. |
| 2012/0232977 A1 | 9/2012 | Calman et al. |
| 2012/0310826 A1 | 12/2012 | Chatterjee |
| 2013/0166332 A1 | 6/2013 | Hammad |
| 2013/0226682 A1 | 8/2013 | Grossman |
| 2014/0040127 A1 | 2/2014 | Chatterjee et al. |
| 2014/0067712 A1 | 3/2014 | Prasad et al. |
| 2014/0100994 A1 | 4/2014 | Tatzel et al. |
| 2014/0172559 A1 | 6/2014 | Calman et al. |
| 2014/0181678 A1 | 6/2014 | Louchheim et al. |
| 2014/0279426 A1 | 9/2014 | Holman et al. |
| 2014/0330511 A1 | 11/2014 | Tison et al. |
| 2014/0337175 A1 | 11/2014 | Katzin et al. |
| 2014/0379468 A1 | 12/2014 | Ganesh et al. |
| 2015/0012426 A1 | 1/2015 | Purves et al. |
| 2015/0046284 A1 | 2/2015 | Hart |
| 2015/0058229 A1 | 2/2015 | Wiacek et al. |
| 2015/0066722 A1 | 3/2015 | Calman et al. |
| 2015/0073907 A1 | 3/2015 | Purves et al. |
| 2015/0082203 A1 | 3/2015 | James et al. |
| 2015/0154446 A1 | 6/2015 | Masood et al. |
| 2015/0186984 A1 | 7/2015 | Loganathan |
| 2015/0206218 A1 | 7/2015 | Banerjee et al. |
| 2015/0221151 A1 | 8/2015 | Bacco et al. |
| 2015/0229750 A1 | 8/2015 | Zhou et al. |
| 2015/0254510 A1 | 9/2015 | McKinnon et al. |
| 2015/0294322 A1 | 10/2015 | Grigg et al. |
| 2015/0302027 A1 | 10/2015 | Wnuk et al. |
| 2015/0324562 A1 | 11/2015 | Scavezze et al. |
| 2015/0339468 A1 | 11/2015 | Son et al. |
| 2015/0348329 A1 | 12/2015 | Carre et al. |
| 2015/0363761 A1 | 12/2015 | Grigg et al. |
| 2015/0363764 A1 | 12/2015 | Grigg et al. |
| 2016/0049095 A1 | 2/2016 | Yannier et al. |
| 2016/0063484 A1 | 3/2016 | Carpenter et al. |
| 2016/0063517 A1 | 3/2016 | Sorensen |
| 2016/0078449 A1 | 3/2016 | Banerjee |
| 2016/0098936 A1 | 4/2016 | Solomon |
| 2016/0171767 A1 | 6/2016 | Anderson |
| 2016/0188861 A1 | 6/2016 | Todeschini |
| 2016/0189426 A1 | 6/2016 | Thomas et al. |
| 2016/0206960 A1 | 7/2016 | Allen et al. |
| 2016/0210784 A1 | 7/2016 | Ramsby et al. |
| 2016/0210790 A1 | 7/2016 | Rasane et al. |
| 2016/0217623 A1 | 7/2016 | Singh |

OTHER PUBLICATIONS

Dolan, H. et al., "Facilitating Digital Data Transfers Using Augmented Reality Display Devices," U.S. Appl. No. 15/353,005, filed Nov. 16, 2016, 50 pages.

Johansen, J. N. et al., "Real World Gamification Using Augmented Reality User Devices ," U.S. Appl. No. 15/377,690, filed Dec. 13, 2016, 70 pages.

Adams, A. J. et al., "Virtual Reality Dynamic Authentication," U.S. Appl. No. 15/367,590, filed Dec. 2, 2016, 58 pages.

Lee, J. et al., "Contextual Augmented Reality Overlays," U.S. Appl. No. 15/363,388, filed Nov. 29, 2016, 50 pages.

Waldron, W. H. et al., "Virtual Assessments Using Augmented Reality User Devices," U.S. Appl. No. 15/364,927, filed Nov. 30, 2016, 85 pages.

Votaw, E. S. et al., "Remote Document Execution and Network Transfer Using Augmented Reality Display Devices." U.S. Appl. No. 15/353,370, filed Nov. 16, 2016, 42 pages.

Dolan, H. et al., "Augmented Reality Headset and Digital Wallet," U.S. Appl. No. 15/363,692, filed Nov. 29, 2016, 41 pages.

Johansen, J. N., "Facilitating Dynamic Across-Network Location Determination Using Augmented Reality Display Devices," U.S. Appl. No. 15/372,909, filed Dec. 8, 2016, 44 pages.

Ogrinz, M. et al., "Facilitating Network Security Analysis Using Virtual Reality Display Devices." U.S. Appl. No. 15/367,896, filed Dec. 2, 2016, 44 pages.

Dintenfass, K., "Property Assessments Using Augmented Reality User Devices," U.S. Appl. No. 15/367,435, filed Dec. 2, 2016, 81 pages.

Wadley, C. D. et al., "Facilitating Across-Network, Multi-User Sessions Using Augmented Reality Display Devices," U.S. Appl. No. 15/397,086, filed Jan. 3, 2017, 49 pages.

Dintenfass, K., "Geo-targeted Property Analysis Using Augmented Reality User Devices," U.S. Appl. No. 15/367,554, filed Dec. 2, 2016, 80 pages.

Adams, A. J. et al., "Augmented Reality Dynamic Authentication for Electronic Transactions," U.S. Appl. No. 15/367,551, filed Dec. 2, 2016, 57 pages.

Lee, J., "Facilitating Digital Data Transfers Using Virtual Reality Display Devices," U.S. Appl. No. 15/363,185, filed Nov. 29, 2016, 52 pages.

(56) References Cited

OTHER PUBLICATIONS

Dintenfass, K., "Real Estate Property Project Analysis Using Augmented Reality User Devices," U.S. Appl. No. 15/367,822, filed Dec. 2, 2016, 81 pages.
Adams, A. J. et al., "Augmented Reality Dynamic Authentication," U.S. Appl. No. 15/367,502, filed Dec. 2, 2016, 57 pages.
Waldron, W. H. et al., "Virtual Behavior Training Using Augmented Reality User Devices," U.S. Appl. No. 15/377,795, filed Dec. 13, 2016, 71 pages.
Dolan, H. et al., "User Authentication and Authorization for Electronic Transaction," U.S. Appl. No. 15/363,495, filed Nov. 29, 2016, 41 pages.
Waldron, W. H. et al., "Geolocation Notifications Using Augmented Reality User Devices," U.S. Appl. No. 15/365,272, filed Nov. 30, 2016, 85 pages.
Waldron, W. H. et al., "Object Recognition and Analysis Using Augmented Reality User Devices," U.S. Appl. No. 15/365,511, filed Nov. 30, 2016, 86 pages.
Wadley, C. D. et al., "Facilitating Across-Network Handoffs for Devices Using Augmented Reality Display Devices," U.S. Appl. No. 15/397,031, filed Jan. 3, 2017, 49 pages.
Wadley, C. D. et al., "Facilitating Across-Network Handoffs for an Assistant Using Augmented Reality Display Devices," U.S. Appl. No. 15/397,125, filed Jan. 3, 2017, 48 pages.

FACILITATING DYNAMIC ACROSS-NETWORK LOCATION DETERMINATION USING AUGMENTED REALITY DISPLAY DEVICES

TECHNICAL FIELD

The present disclosure relates generally to performing operations using an augmented reality display device that overlays graphic objects with objects in a real scene.

BACKGROUND

Users may require contextual and directional information to complete a task. Two or more users may interact to facilitate a transaction or to facilitate communicating and gathering information. Before two users interact, at least one of the users must identify the other user. A user may identify a location of the other user and review contextual information related to the other user to facilitate a meeting between the two users. Information may be transferred across a network to provide a user with location and contextual information.

SUMMARY

In one embodiment, an augmented reality system includes a central server, a local server, and an augmented reality user device. The central server includes account information for a first customer and institution information. The institution information includes employee specialty data indicating one or more specialties of each of a plurality of employees of an institution. The institution information includes employee office data indicating an office of a plurality of offices of each of the plurality of employees. Each of the plurality of offices is an office of the institution and each office is geographically distinct.

The local server is located at a first office of the plurality of offices and includes location information. The location information indicates the location of the first customer and a location of the plurality of employees of the first office.

The augmented reality user device receives location information for a customer from the local server. The augmented reality user device communicates a request for the institution information based on the geographical location of the customer. The augmented reality user device displays a contact card for at least one employee near the customer's location. The contact card for each of the employees includes a specialty associated with the employee. The augmented reality user device communicates a request to locate one of the employees and creates a virtual overlay of the location of the requested employee in a real scene.

In another embodiment, an augmented reality user device generates a request to retrieve a specialty associated with an employee. The augmented reality user device receives a request from a customer based on the specialty. The augmented reality user device receives location information for the customer, and the augmented reality user devices generates a virtual overlay of the location of the first customer upon a determination that the customer and the employee are located in the same office.

The present disclosure presents several technical advantages. In one embodiment, an augmented reality device overlays contextual information in a real scene. When two users interact, context information may be useful to facilitate the interaction. For example, contextual information may include information about another user and/or information about the interaction. Overlaying information in a real scene reduces or eliminates the problem of being inadequately informed during an interaction.

In another embodiment, an augmented reality user device facilitates locating individuals and/or objects by dynamically sending and/or receiving geographical location information for the individual and/or object. In this embodiment, the augmented reality user device may generate a virtual overlay in a real scene that identifies a location of the individual and/or object. For example, the augmented reality user device may highlight the individual and/or object. As another example, the augmented reality user device may highlight a path and/or provide directions to the individual and/or object when the individual and/or object is not in the user's field of view.

In an embodiment, an augmented reality user device employs identification tokens to allow data transfers to be executed using less information than other existing systems. By using less information to perform data transfers, the augmented reality user device reduces the amount of data that is communicated across the network. Reducing the amount of data that is communicated across the network improves the performance of the network by reducing the amount of time network resource are occupied.

The augmented reality user device generates identification tokens based on biometric data which improves the performance of the augmented reality user device by reducing the amount of information required to identify a person, authenticate the person, and facilitate a data transfer.

Identification tokens are encoded or encrypted to obfuscate and mask information being communicated across a network. Masking the information being communicated protects users and their information in the event of unauthorized access to the network and/or data occurs.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
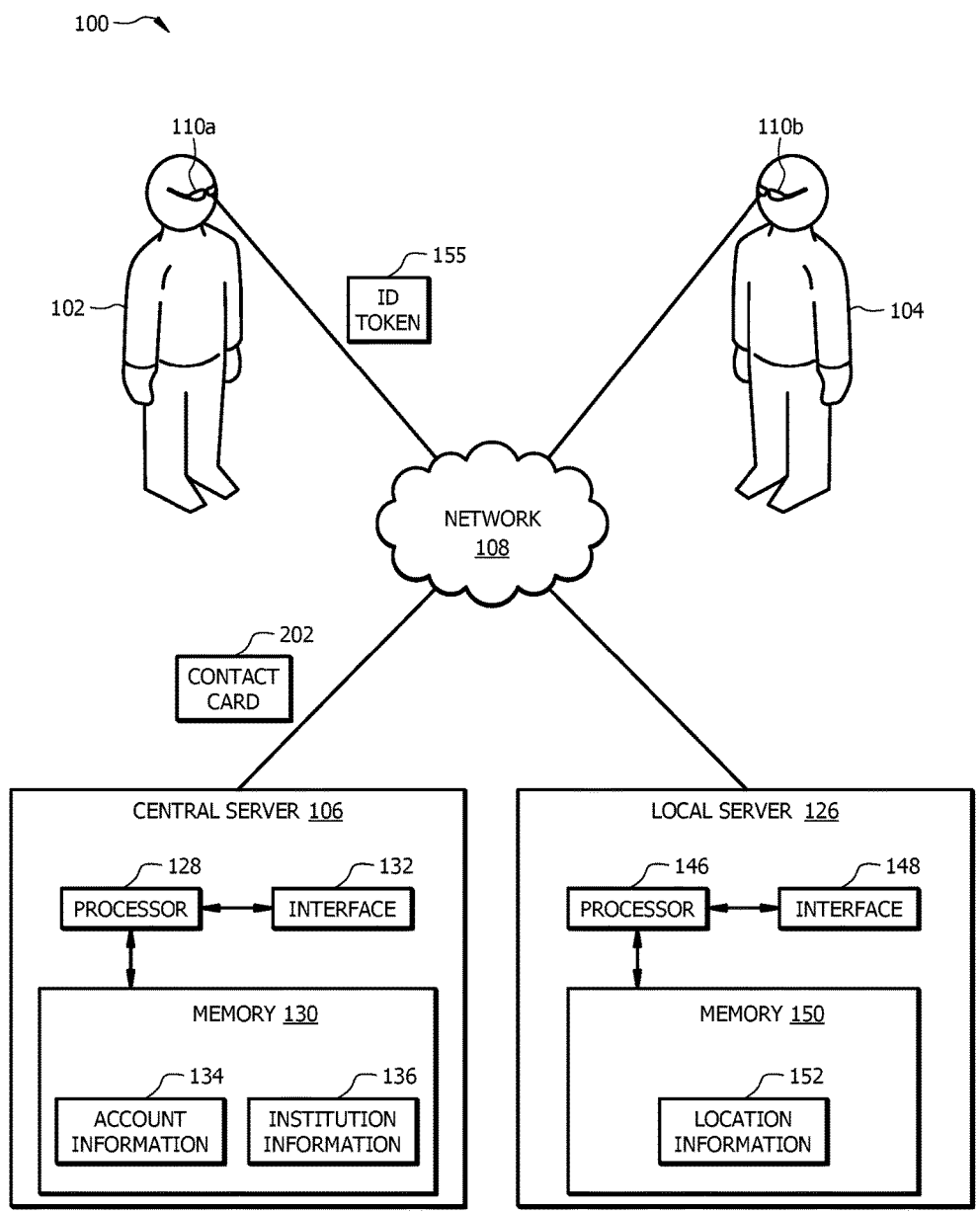
FIG. 1 is a schematic diagram of an embodiment of an augmented reality system configured to facilitate dynamic location determination.

Matching users and facilitating communications between the users causes several technical challenges. A user of a system may require information regarding other individuals to determine whether to meet with one or more of the individuals. Once a user initiates or otherwise agrees to meet with an individual, the user may be required to determine a geographic location for the individual and navigate to the geographic location. Once the users begin interacting, contextual information may be required to facilitate the interaction.

One technical solution is to provide a system that includes an augmented reality user device that overlays contextual information on a real scene for a user. For example, a customer may request to speak with a particular employee or one of a plurality of employees having a specific specialty. The augmented reality user device may overlay contextual information that includes a list of employees at a particular geographic location along with specialty information for each of the employees indicating a specialty associated with the employee. The customer may view the contextual information and identify one or more employees to speak with. The augmented reality user device may communicate a request to speak with the employee.

The augmented reality user device communicates the request to a local server. The local server may determine if the employee is available before facilitating a meeting with the customer and the employee. For example, the augmented reality user device may display, for the customer, the location of the employee. As another example, an employee may be associated with an augmented reality user device that displays the location of the customer.

As the customer and employee meet, the augmented reality user device for the customer may display information to facilitate the meeting. For example, the augmented reality user device associated with the customer may display a picture of the employee and specialty information associated with the employee indicating that the employee specializes in one or more areas. This may allow the customer to identify the employee and provide information to facilitate the meeting.

As another example, the employee may be associated with an augmented reality user device. As the employee and customer meet, the augmented reality user device for the employee may overlay contextual information to facilitate the meeting. The augmented reality user device may overlay a picture and identifying information for the customer. The augmented reality user device may overlay account information for one or more of the customer's accounts.

Overlaying contextual information in a real environment allows two or more uses to interact with adequate information. Prior art systems may require a user of a system to gather information from an individual and retrieve contextual information based on the gathered information. Retrieving this information may require a substantial amount of time and frustration for users. The current disclosure recognizes the technical advantages of automatically identifying and retrieving information to match individuals and facilitate a meeting between the individuals. The current disclosure further recognizes the technical advantages of generating a virtual overlay of the information for a user of an augmented reality device to utilize in real time.

FIG. 1 illustrates an augmented reality system 100 configured to facilitate matching and location determination of users of system 100. As illustrated in FIG. 1, system 100 includes customer 102, employee 104, augmented reality ("AR") user devices 110, network 108, central server 106, and local server 126. Customer 102 and/or employee 104 may utilize system 100 to identify, locate, and receive information for other users of system 100. In particular embodiments, system 100 may increase network security and facilitate location determination in customer-employee matching.

System 100 may be utilized by customer 102 and employee 104. System 100 may include any number of customers 102 and employees 104. Customers 102 are generally users of system 100 that receive information and/or conduct business with an enterprise. For example, customer 102 is an account holder, in some embodiments. Employee 104 is generally an employee of an enterprise that interacts with customers 102. For example, employee 104 interacts with customer 102 to aid customer 102 in receiving information and/or conducting business. In some embodiments, employee 104 may be a specialist. For example, employee 104 is an auto loan specialist, a retirement specialist, a home mortgage specialist, a business loan specialist, and/or any other type of specialist. Although described as a customer and employee, customer 102 and employee 104 may be any suitable type of users that exchange information. In an embodiment, customer 102 utilizes system 100 to identify employee 104. For example, customer 102 may identify employee 104 based on a specialty associated with employee 104. Customer 102 may request to meet with the identified employee 104, and system 100 facilitates determining a geographic location of employee 104. System 100 may provide real-time contextual information for customer 102 as customer 102 is meeting with employee 104.

In an embodiment, employee 104 may utilize system 100 to facilitate a meeting with customer 102. Employee 104 may receive a request to meet with customer 102. Employee 104 may use system 100 to determine a geographic location of customer 102. Employee 104 may navigate to customer 102 using system 100. System 100 may provide real-time contextual information to employee 104 to facilitate the meeting. For example, system 100 may display identifying information, account information, or any other suitable type of information for customer 102.

System 100 comprises augmented reality ("AR") user devices 110a and 110b, associated with customer 102 and employee 104, respectively. System 100 may include any number of AR user devices 110. For example, each customer 102 and employee 104 may be associated with an AR user device 110. As yet another example, a plurality of customers 102 and/or employees 104 may each use a single AR user device 110. In the illustrated embodiment, AR user device 110 is configured as a wearable device. For example, a wearable device is integrated into an eyeglass structure, a visor structure, a helmet structure, a contact lens, or any other suitable structure. In some embodiments, AR user device 110 may be or may be integrated with a mobile user device. Examples of mobile user devices include, but are not limited to, a mobile phone, a computer, a tablet computer, and a laptop computer. Additional details about AR user device 110 are described in FIG. 3. The AR user device 110 is configured to display a contact card 202 to identify one or more customers 102 and/or employees 104. AR user device 110 is configured to confirm a user's identity using, e.g., a biometric scanner such as a retinal scanner, a fingerprint scanner, a voice recorder, and/or a camera. AR user device 110 may be configured to display a geographic location of one or more individuals and/or objects. Examples of an augmented reality digital data transfer using AR user device 110 are described in more detail below and in FIGS. 4 and 5.

AR user device 110 may include biometric scanners. For example, customer 102 may verify employee 104 using AR user device 110 using one or more biometric scanners. As another example, employee 104 may verify customer 102 using AR user device 110 using one or more biometric scanners. AR user device 110 may comprise a retinal scanner, a fingerprint scanner, a voice recorder, and/or a camera. AR user device 110 may comprise any suitable type of device to gather biometric measurements. AR user device 110 uses biometric measurements received from the one or more biometric scanners to confirm a user's identity, such as customer's 102 identity and/or employee's 104 identity. For example, AR user device may compare the received biometric measures to predetermined biometric measurements for a user.

In particular embodiments, AR user device 110 generates identity confirmation token 155. Identify confirmation token 155 generally facilitates transferring data through network 108. Identity confirmation token 155 is a label or descriptor used to uniquely identify a user. In some embodiments, identity confirmation token 155 includes biometric data for the user. AR user device 110 confirms customer's 102 identity by receiving biometric data for customer 102 and comparing the received biometric data to predetermined biometric data. AR user device 110 generates identity confirmation token 155 and may include identity confirmation token 155 in requests to central server 106 and/or local server 126.

Network 108 facilitates communication between and amongst the various components of system 100. This disclosure contemplates network 108 being any suitable network operable to facilitate communication between the components of system 100. Network 108 may include any interconnecting system capable of transmitting audio, video, signals, data, messages, or any combination of the preceding. Network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Central server 106 generally communicates account information 134 and institution information 136 to AR user devices 110. As illustrated, central server 106 includes processor 128, memory 130, and interface 132. This disclosure contemplates processor 128, memory 130, and interface 132 being configured to perform any of the operations of central server 106 described herein. Central server 106 may be located remote to customer 102 and/or employee 106. Central server 106 may include information for a plurality of offices associated with an enterprise. In particular embodiments, central server 106 may increase network security and facilitate matching users of system 100.

Processor 128 is any electronic circuitry, including, but not limited to microprocessors, application specific integrated circuits (ASIC), application specific instruction set processor (ASIP), and/or state machines, that communicatively couples to memory 130 and interface 132 and controls the operation of central server 106. Processor 128 may be 8-bit, 16-bit, 32-bit, 64-bit or of any other suitable architecture. Processor 128 may include an arithmetic logic unit (ALU) for performing arithmetic and logic operations, processor registers that supply operands to the ALU and store the results of ALU operations, and a control unit that fetches instructions from memory 130 and executes them by directing the coordinated operations of the ALU, registers and other components. Processor 128 may include other hardware and software that operates to control and process information. Processor 128 executes software stored on memory 130 to perform any of the functions described herein. Processor 128 controls the operation and administration of central server 106 by processing information received from network 108, AR user device(s) 110, and memory 130. Processor 128 may be a programmable logic device, a microcontroller, a microprocessor, any suitable processing device, or any suitable combination of the preceding. Processor 128 is not limited to a single processing device and may encompass multiple processing devices.

Interface 132 represents any suitable device operable to receive information from network 108, transmit information through network 108, perform suitable processing of the information, communicate to other devices, or any combination of the preceding. For example, interface 132 transmits data to AR user device 110. As another example, interface 110 receives information from AR user device 110. As a further example, interface 132 transmits data to—and receives data from—local server 126. Interface 132 represents any port or connection, real or virtual, including any suitable hardware and/or software, including protocol conversion and data processing capabilities, to communicate through a LAN, WAN, or other communication systems that allows central server 106 to exchange information with AR user devices 110, local server 126, and/or other components of system 100 via network 108.

Memory 130 may store, either permanently or temporarily, data, operational software, or other information for processor 128. Memory 130 may include any one or a combination of volatile or non-volatile local or remote devices suitable for storing information. For example, memory 140 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 128 to perform one or more of the functions described herein. In particular embodiments, memory 130 may store virtual account information 134 and institution information 136. This disclosure contemplates memory 130 storing any of the elements stored AR user device 110, local server 126, and/or any other suitable components of system 100.

Account information 134 generally includes information for accounts of customer 102. Customer 102 may have one or more accounts with an enterprise. Account information 134 may indicate a type of account, an account balance, account activity, personal information associated with customer 102, and/or any other suitable type of account information. For example, customer 102 may have a checking account. Account information 134 may identify the checking account. Account information 134 may comprise a balance for the account, credits and/or debits of the account, a debit card associated with the account, and/or any other suitable information. As another example, account information 134 may identify a retirement account associated with customer 102. In this example, account information 134 may include a balance for the account, account assets, account balances, customer's 102 age, customer's 102 preferred retirement age, and/or any other suitable type of information. Customer 102 may be associated with any number of accounts. Customer 102 may not be associated with any accounts. In particular embodiments, account information 134 is encoded or encrypted to obfuscate and mask information being communicated across a network. Masking the information being communicated protects users and their information in the event of unauthorized access to the network and/or data occurs.

Institution information 136 generally facilitates selecting an employee 104 to select to assist customer 102. Institution information 136 may include a list of all or substantially all employees 104 associated with an enterprise. Institution information 136 may include information about one or more employees 104. For example, institution information 136 may include employee office data that identifies an office of a plurality of offices associated with employee 104. As another example, institution information 136 may include employee specialty data that identifies one or more specialties associated with employee 104 (e.g., employee 104 may be an auto loan specialist, a home loan specialist, a retirement specialist, and/or any other suitable specialist). As yet another example, institution information may indicate an availability of employee 104. In this example, central server 106 may determine an availability based on an employee's 104 calendar. Employee 104 may manually set availability in some embodiments. An employee 104 availability may be determined in any suitable manner. In particular embodiments, institution information 136 is encoded or encrypted to obfuscate and mask information being communicated across a network. Masking the information being communicated protects users and their information in the event of unauthorized access to the network and/or data occurs.

Local server 126 generally communicates location information 152 to AR user devices 110. As illustrated, local server 126 includes processor 146, interface 148, and memory 150. This disclosure contemplates processor 146 and memory 150 being configured to perform any of the operations of local server 126 described herein. Local server 126 may be located within an office of a plurality of offices of an enterprise.

Processor 146 is any electronic circuitry, including, but not limited to microprocessors, application specific integrated circuits (ASIC), application specific instruction set processor (ASIP), and/or state machines, that communicatively couples to memory 150 and interface 148 and controls the operation of local server 126. Processor 146 may be 8-bit, 16-bit, 32-bit, 64-bit or of any other suitable architecture. Processor 128 may include an arithmetic logic unit (ALU) for performing arithmetic and logic operations, processor registers that supply operands to the ALU and store the results of ALU operations, and a control unit that fetches instructions from memory 150 and executes them by directing the coordinated operations of the ALU, registers and other components. Processor 146 may include other hardware and software that operates to control and process information. Processor 146 executes software stored on memory 150 to perform any of the functions described herein. Processor 146 controls the operation and administration of local server 126 by processing information received from network 108, AR user device(s) 110, and memory 150. Processor 146 may be a programmable logic device, a microcontroller, a microprocessor, any suitable processing device, or any suitable combination of the preceding. Processor 146 is not limited to a single processing device and may encompass multiple processing devices.

Interface 148 represents any suitable device operable to receive information from network 108, transmit information through network 108, perform suitable processing of the information, communicate to other devices, or any combination of the preceding. For example, interface 148 transmits data to AR user device 110. As another example, interface 148 receives information from AR user devices 110. As a further example, interface 148 receives data from central server 106. Interface 148 represents any port or connection, real or virtual, including any suitable hardware and/or software, including protocol conversion and data processing capabilities, to communicate through a LAN, WAN, or other communication systems that allows local server 126 to exchange information with AR user devices 110, central server 106, and/or other components of system 100 via network 108.

Memory 150 may store, either permanently or temporarily, data, operational software, or other information for processor 146. Memory 150 may include any one or a combination of volatile or non-volatile local or remote devices suitable for storing information. For example, memory 150 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 150, a disk, a CD, or a flash drive. In particular embodiments, the software may include an application executable by processor 146 to perform one or more of the functions described herein. In particular embodiments, memory 150 may store virtual location information 152. This disclosure contemplates memory 150 storing any of the elements stored AR user device 110, central server 106, and/or any other suitable components of system 100.

Location information 152 generally indicates the location of customer 102, employee 104, any other users of system 100, and/or any other suitable person or object. In some embodiments, AR user devices 110a and 110b transmit geographic information for customer 102 and employee 104, respectively, to local server 126. For example, AR user device 110 may use GPS information and/or a beacon to determine the geographic information of a user before communicating the geographic information to local server 126 to store as location information 152. In particular embodiments, location information 152 may include the geographic information for customer 102 and/or employee 104. In particular embodiments, location information 152 is encoded or encrypted to obfuscate and mask information being communicated across a network. Masking the information being communicated protects users and their information in the event of unauthorized access to the network and/or data occurs.

In a first exemplary embodiment of operation, customer 102 utilizes AR user device 110a to facilitate determining, locating, and interacting with employee 104. Customer 102 generates a request for account information 134 using AR user device 110a. AR user device 110a receives biometric data from customer 102 to authenticate the customer's 102 identity. AR user device 110a authenticates the customer's 102 identity by comparing the received biometric data from customer 102 to predetermined biometric data for customer 102. AR user device 110a generates an identity confirmation token 155 that indicates the authentication of customer 102.

AR user device 110a transmits a request to central server 106 for account information 134 associated with customer 102. The request includes identity confirmation token 155. Central server 106 confirms customer's 102 identification using identification token 155. Once central server 106 confirms the customer's 102 identity, it communicates account information 134 to AR user device 110a. AR user device 110*a* generates a virtual overlay that displays all or part of the received account information 134 for customer 102. For example, AR user device 110*a* may display balances, debits, credits, or any other suitable information associated with one or more of customer's 102 accounts.

Customer 102 generates a request for institution information 136 using AR user device 110. AR user device user device 110*a* communicates a request to local server 126 for location information 152 in response to the request. Local server 126 communicates location information 152 to AR user device 110*a*. The location information 152 indicates a geographic location of AR user device 110*a*. AR user device 110*a* then communicates the request for institution information 136 to central server 106. The request includes the geographic location of AR user device 110*a*. Central server 106 communicates institution information 136 to AR user device 110*a* in response to the request. Central server 106 may communicate institution information 136 for one or more offices at or near the geographic location of AR user device 110*a*.

AR user device 110*a* generates a virtual overlay in a real scene that displays received institution information 136. For example, the virtual overlay may include specialty types for an office near customer 102 (e.g., all or substantially all specialties associated with the office). In some embodiments AR user device 110 displays a list of employees 104 of the office and their respective specialties using institution information 136. In some embodiments, AR user device 110*a* displays a plurality of contact cards 202 to customer 102. Each contact card 202 may be associated with an employee 104. As discussed in more detail in relation to FIG. 2, contact card 202 may include information for an employee 104 at the office. For example, contact card 202 displays a name, picture, and specialty associated with the employee 104. Generating a virtual overlay of information onto a real scene provides the technical advantage of providing users information to facilitate a meeting between the users.

Customer 102 may generate a request to speak with an employee 104 who specializes in a specific specialty using AR user device 110*a*. For example, a customer 104 may request to speak with an auto loan specialist, a retirement specialist, or any other type of specialist. Customer 102 may identify employee 104 by viewing one or more contact cards 202. In some embodiments, customer 102 may request an employee 104 with a particular specialty and AR user device 110*a* and/or any other component of system 100 may determine an employee 104 based on institution information 136 and/or account information 134. System 100 may identify one or more employees 104 with the requested specialty and display the geographic location of the one or more identified employees using AR user device 110. In some embodiments, system 100 may identify an employee 104 based on an employee's 104 availability indicated in institution information 136.

AR user device 110*a* may display the geographic location of the employee 104 for customer 102 AR user device 110*a* may display multiple people. In this example, the requested employee 104 may be highlighted. For example, the other people in the display may appear opaque or grey. As another example, the requested employee 104 may have an arrow, circle, or any other type of indication to display the location of employee 104. In some embodiments, employee 104 may not be in the field of view of customer 102. In these embodiments, AR user device 110*a* may highlight a path to reach the employee 104.

As customer 102 reaches employee 104, AR user device 110*a* may generate a virtual overlay to facilitate an interaction between customer 102 and employee 104. For example, customer 102 may view a picture of employee 104 through the virtual overlay generated by AR user device 110*a*. Customer 102 may confirm employee's 104 identity by determining that employee 104 appears similar to the picture of employee 104 on contact card 202. As another example, AR user device 110*a* may perform facial recognition to identify employee 104. AR user device 110*a* may display contextual information for facilitating the interaction between customer 102 and employee 104. AR user device 110*a* may create a virtual overlay on a real scene that includes account information 134 and/or institution information 136. For example, AR user device 110*a* may display information for employee 104 such as employee's 104 name and availability to allow customer 102 to reduce the time of the interaction and determine when the interaction must end. Displaying contextual information in a real scene provides the technical advantage of facilitating the interaction between customer 102 and employee 104.

In a second exemplary embodiment of operation, employee 104 utilizes AR user device 110*b* to facilitate locating and interacting with customer 102. After employee 104 has accessed AR user device 110*b*, AR user device 110*b* determines employee's 104 identity. AR user device 110*b* receives biometric data from employee 104 to authenticate employee's 104 identity. AR user device 110*b* authenticates the employee's 104 identity by comparing the received biometric data from employee 104 to predetermined biometric data for employee 104. AR user device 110*b* generates an identity confirmation token 155 that indicates the authentication of employee 104.

AR user device 110*b* generates a request for institution information 136 associated with employee 104. The request may include identification token 155 that includes an identification of employee 104 and/or a confirmation of employee's 104 identity. Central server 106 communicates institution information 136 for employee 104 to AR user device 110*b* in response to the request. As discussed previously, institution information 136 for employee 104 includes information for employee 104 such as specialties associated with employee 104, a name of employee 104, a picture of employee 104, and office of employee 104, and/or any other suitable information.

AR user device 110*b* communicates a request for location information 152 to local server 126 and local server 126 communicates location information 152 in response to the request. Location information 152 includes the geographic location of AR user device 110*b*. For example, the geographic location may indicate that AR user device 110*b* is in an office and may indicate AR user device's 110*b* location within the office.

Customer 102 may generate a request to interact with employee 104, as previously discussed. AR user device 110*b* receives a notification of the request and communicates the notification to employee 104. AR user device 110*b* determines the location of customer 102 using location information 152.

AR user device 110*b* may display the geographic location of customer 102. For example, display 200 may display multiple people. In this example, the requested customer 102 may be highlighted. For example, the other people in the display may appear opaque or grey. As another example, the customer 102 may have an arrow, circle, or any other type of indication to display the location of customer 102. In some embodiments, customer 102 may not be in employee's 104 the field of view. In these embodiments, AR user device 110*b* may highlight a path to reach customer 102. Display 200 is described in more detail in relation to FIG. 2.

As employee 104 reaches customer 102, AR user device 110*b* may generate a virtual overlay to facilitate the interaction. For example, employee 104 may view a picture of customer through the virtual overlay generated by AR user device 110. Employee 104 may confirm customer's 102 identity by determining that customer 102 appears similar to the picture of customer 102 on contact card 202. As another example, AR user device 110*b* may perform facial recognition to identify customer 102. AR user device 110*b* may display contextual information for facilitating the interaction between employee 104 and customer 102. AR user device 110*b* may create a virtual overlay on a real scene that includes account information 134 and/or institution information 136. For example, AR user device 110*b* may display account information 134 to employee 104. Employee 104 may view account information 134 to facilitate the interaction between customer 102 and employee 104. For example, if customer 102 has a question about a checking account, employee 104 may view account information 134 for the checking account to answer customer's 102 questions. Displaying contextual information in a real scene provides the technical advantage of facilitating the interaction between customer 102 and employee 104.

Modifications, additions, or omissions may be made to system 100 without departing from the scope of the invention. For example, system 100 may include any number of processors 128/146, memory 130/150, AR user devices 110, central servers 106 and/or local servers 126. As a further example, components of system 100 may be separated or combined. For example, central server 106 and local server 126 may be combined. As another example, central server 106 and/or local server 136 may be combining with one or more AR user devices 110.

Figure 2A:
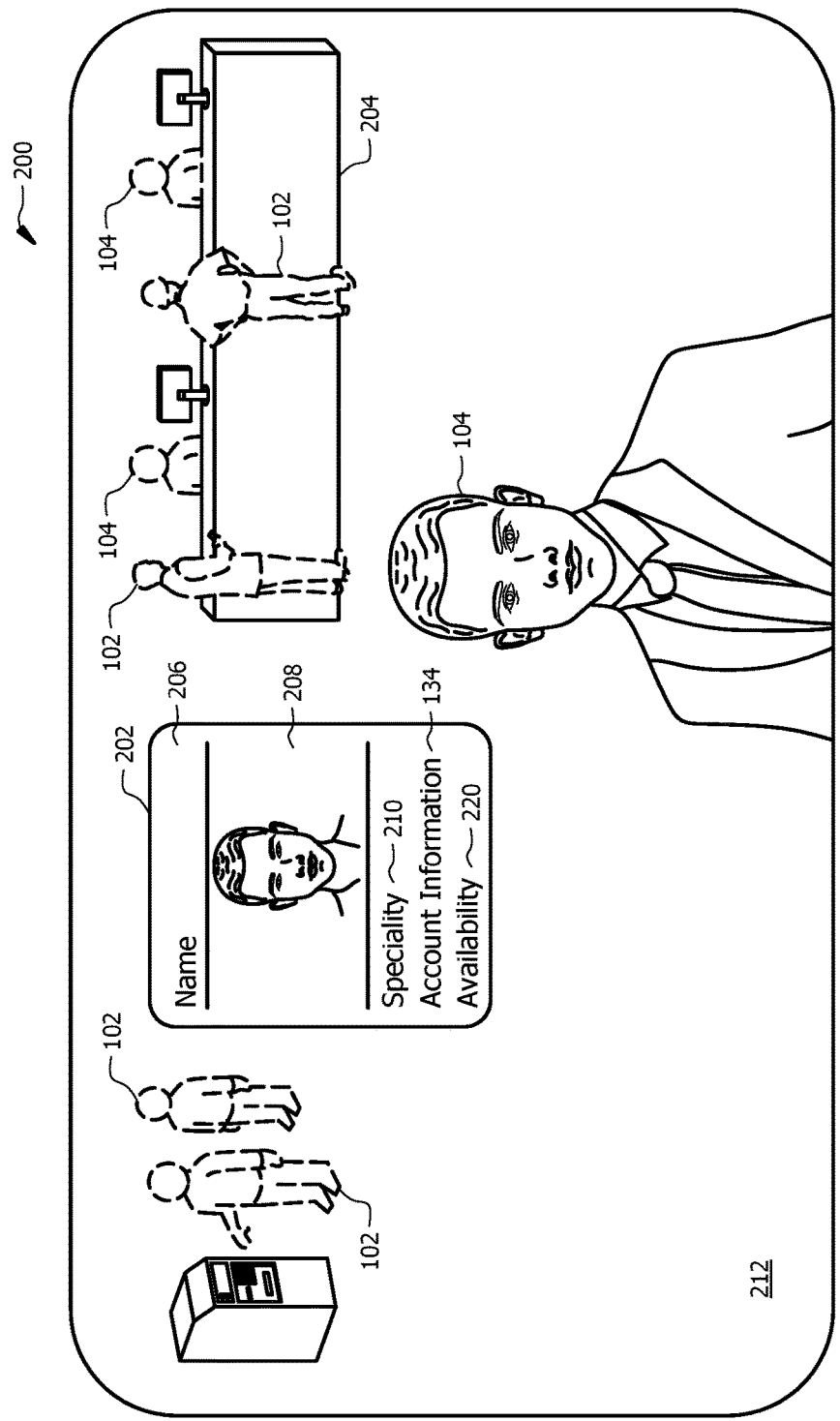
FIG. 2a is a first person view of an embodiment for an augmented reality user device display overlaying virtual objects with a real scene.

FIG. 2*a* is a first person view 200 of an embodiment from AR user device 110 overlaying virtual objects in conjunction with tangible objects 204 in a real scene 212. In some embodiments, customer 102 views first person view 200 using AR user device 110*a*. In particular embodiments, AR user device 110*a* may then display the geographic location of an identified employee 104. In the illustrated embodiment, the identified employee 104 is highlighted. As illustrated, other people in first person view 200 may be opaque or grey. In other examples, the identified employee may be identified by an arrow, a circle, or any other type of indicator. In examples, where the identified employee 104 is not in first person view 200, first person view 200 may display a route to the identified employee 104. For example, first person view 200 may include a highlighted path. In particular embodiments, AR user device 110 captures an image employee 104 and performs facial recognition on the captured image to verify employee's 104 identification. This provides the technical advantage of locating and identifying employee 104.

First person view 200 may comprise contact card 202. Contact card 202 is a virtual overlay in real scene 212. Generally, contact card 202 includes information for one or more users of system 100. For example, contact card 202 may include employee's 104 name and picture, a list of specialties 210 associated with employee 104, account information 134 for customer 102, employee's 104 availability and/or any other suitable information. Users may view contact card 202 to receive information for other users. For example, customer 102 may view a contact card 202 for one or more employees 104. Customer 102 may select an employee 104 via contact card 202 and request to speak with the employee 104.

Figure 2B:
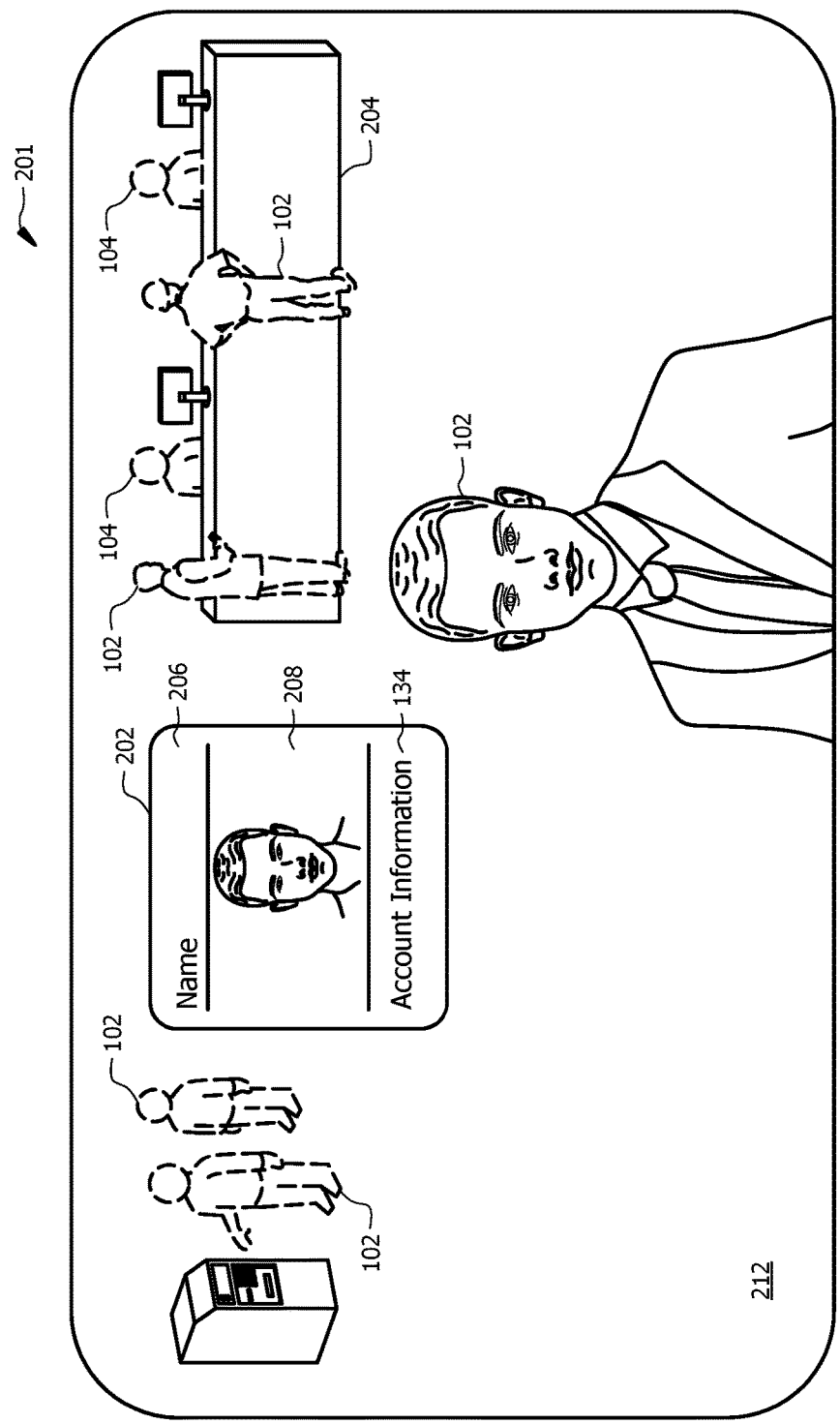
FIG. 2b is a first person view of an embodiment for an augmented reality user device display overlaying virtual objects with a real scene.

FIG. 2*b* is a first person view 201 of an embodiment from AR user device 110 display overlaying virtual objects in conjunction with tangible objects 204 in a real scene 212. In some embodiments, employee 104 views first person view 201 using AR user device 110*a*. AR user device 110 may display the geographic location of the customer 102. In the illustrated embodiment, customer 102 is highlighted. For example, other people in first person view 201 may be opaque or grey. In other examples, customer 102 may be identified by an arrow, a circle, or any other type of indicator. In examples, where customer 102 is not in first person view 201, first person view 201 may display a route to customer 102. For example, first person view 201 may include a highlighted path. In particular embodiments, AR user device 110 captures an of customer 102 and performs facial recognition on the captured image to verify customer's 102 identity. This provides the technical advantage of locating and identifying customer 102.

First person view 201 may comprise contact card 202. Contact card 202 is a virtual overlay in real scene 212. Generally, contact card 202 includes information for one or more users of system 100. For example, contact card 202 may include customer's 102 name and picture, account information 136 associated with customer 102 and/or any other suitable information. Users may view contact card 202 to receive information for other users. For example, employee 104 may view contact card 202 to determine information for customer 102. Contact card 202 facilitates an interaction between employee 104 and customer 102.

Figure 3:
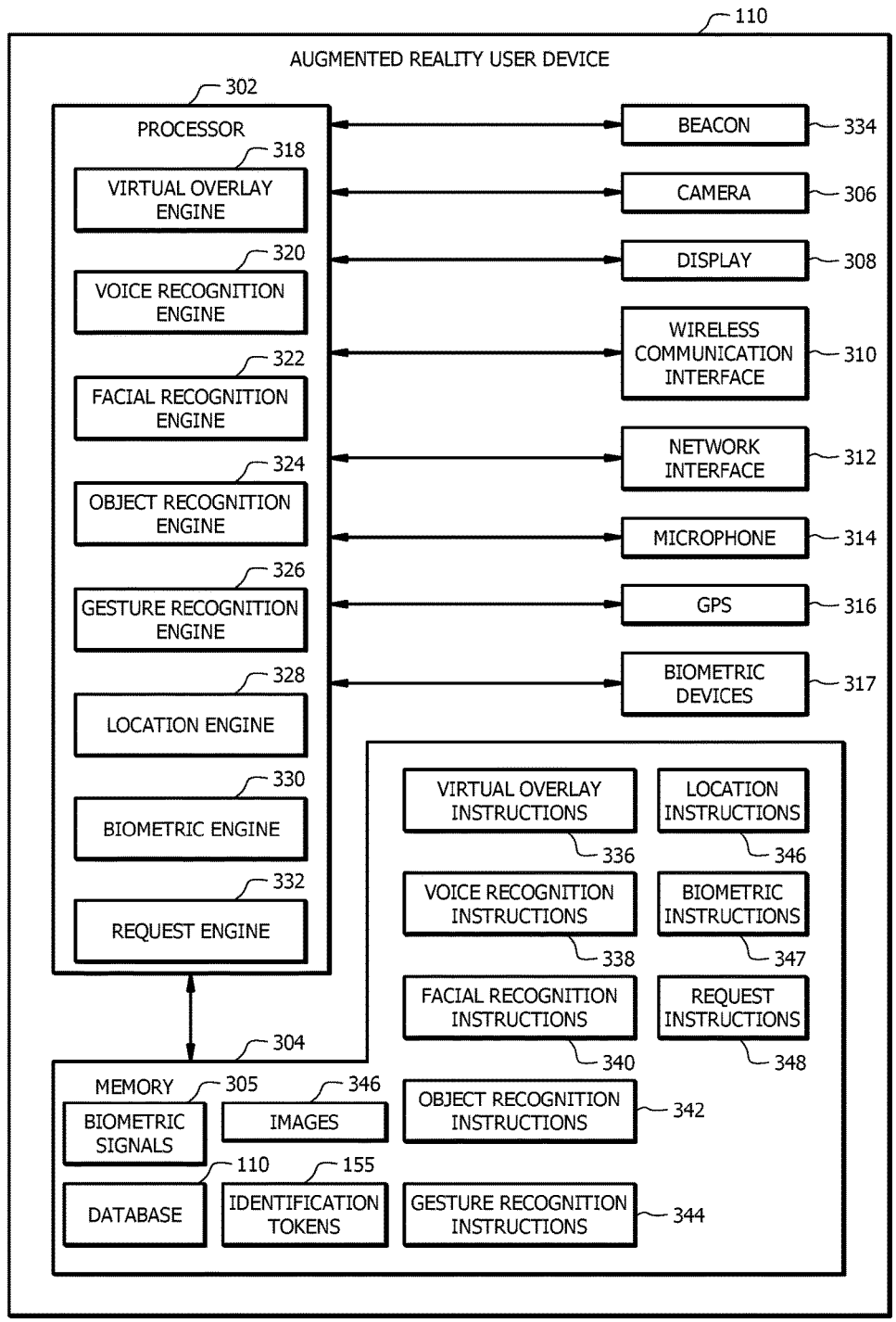
FIG. 3 is a schematic diagram of an embodiment of an augmented reality user device employed by the augmented reality system.

FIG. 3 illustrates an AR user device 110 employed by the augmented reality system 100, in particular embodiments. AR user device 110 may be configured to confirm match two or more users of system 100 and identify the location of the matched users.

AR user device 110 comprises a processor 302, a memory 304, a camera 306, a display 308, a wireless communication interface 310, a network interface 312, a microphone 314, a global position system (GPS) sensor 316, one or more biometric devices 317, and a beacon 334. The AR user device 110 may be configured as shown or in any other suitable configuration. For example, AR user device 110 may comprise one or more additional components and/or one or more shown components may be omitted.

Examples of the camera 306 include, but are not limited to, charge-coupled device (CCD) cameras and complementary metal-oxide semiconductor (CMOS) cameras. The camera 306 is configured to capture images of people, text, and objects within a real environment. The camera 306 may be configured to capture images continuously, at predetermined intervals, or on-demand. For example, the camera 306 may be configured to receive a command from a user to capture an image. In another example, the camera 306 is configured to continuously capture images to form a video stream of image. The camera 306 may be operably coupled to a facial recognition engine 322 and/or object recognition engine 324 and provides images to the facial recognition engine 322 and/or the object recognition engine 324 for processing, for example, to identify people, text, and/or objects in front of the user. Facial recognition engine 322 may confirm customer's 102 identity, employee's 104 identity, and/or the identity of any other suitable person.

The display 308 is configured to present visual information to a user in an augmented reality environment that overlays virtual or graphical objects onto tangible objects in a real scene in real-time. For example, display may display first person view 200. In an embodiment, the display 308 is a wearable optical head-mounted display configured to reflect projected images and allows a user to see through the display. For example, the display 308 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, the display 308 is a graphical display on a user device. For example, the graphical display may be the display of a tablet or smart phone configured to display an augmented reality environment with virtual or graphical objects overlaid onto tangible objects in a real scene in real-time.

Examples of the wireless communication interface 310 include, but are not limited to, a Bluetooth interface, an RFID interface, an NFC interface, a local area network (LAN) interface, a personal area network (PAN) interface, a wide area network (WAN) interface, a Wi-Fi interface, a ZigBee interface, or any other suitable wireless communication interface as would be appreciated by one of ordinary skill in the art upon viewing this disclosure. The wireless communication interface 310 is configured to allow the processor 302 to communicate with other devices. For example, the wireless communication interface 310 is configured to allow the processor 302 to send and receive signals with other devices for the user (e.g. a mobile phone) and/or with devices for other people. The wireless communication interface 310 is configured to employ any suitable communication protocol.

The network interface 312 is configured to enable wired and/or wireless communications and to communicate data through a network, system, and/or domain. For example, the network interface 312 is configured for communication with a modem, a switch, a router, a bridge, a server, or a client. The processor 302 is configured to receive data using network interface 312 from a network or a remote source.

Microphone 314 is configured to capture audio signals (e.g. voice signals or commands) from a user and/or other people near the user. The microphone 314 is configured to capture audio signals continuously, at predetermined intervals, or on-demand. The microphone 314 is operably coupled to the voice recognition engine 320 and provides captured audio signals to the voice recognition engine 320 for processing, for example, to identify a voice command from the user.

The GPS sensor 316 is configured to capture and to provide geographical location information. For example, the GPS sensor 316 is configured to provide the geographic location of a user employing the augmented reality user device 110. The GPS sensor 316 is configured to provide the geographic location information as a relative geographic location or an absolute geographic location. The GPS sensor 316 provides the geographic location information using geographic coordinates (i.e. longitude and latitude) or any other suitable coordinate system.

Examples of biometric devices 317 include, but are not limited to, retina scanners, finger print scanners, voice recorders, and cameras. Biometric devices 317 are configured to capture information about a person's physical characteristics and to output a biometric signal 305 based on captured information. A biometric signal 305 is a signal that is uniquely linked to a person based on their physical characteristics. For example, a biometric device 317 may be configured to perform a retinal scan of the user's eye and to generate a biometric signal 305 for the user based on the retinal scan. As another example, a biometric device 317 is configured to perform a fingerprint scan of the user's finger and to generate a biometric signal 305 for the user based on the fingerprint scan. The biometric signal 305 is used by a biometric engine 330 to identify and/or authenticate a person.

Beacon 334 is configured to capture and provide geographical location information. For example, beacon 334 is configured to provide the geographic location of a user employing the augmented reality user device 110. Beacon 334 produces a signal that is communicated to local server 126 and/or any other suitable component of system 100 to determine a location of augmented reality user device 110. Beacon 334 may produce a radio-frequency (RF) signal, a Bluetooth signal, a radio-frequency identification (RFID) signal, a near-field communication (NFC) signal, or any other suitable type of signal. Local server 126, augmented reality user device 110, and/or any other suitable component of system 100 may user the signals from beacon 334 to determine a location of augmented reality user device 110.

The processor 302 is implemented as one or more CPU chips, logic units, cores (e.g. a multi-core processor), FPGAs, ASICs, or DSPs. The processor 302 is communicatively coupled to and in signal communication with the memory 304, the camera 306, the display 308, the wireless communication interface 310, the network interface 312, the microphone 314, the GPS sensor 316, and the biometric devices 317. The processor 302 is configured to receive and transmit electrical signals among one or more of the memory 304, the camera 306, the display 308, the wireless communication interface 310, the network interface 312, the microphone 314, the GPS sensor 316, and the biometric devices 317. The electrical signals are used to send and receive data (e.g. images 232 and identification tokens 124) and/or to control or communicate with other devices. For example, the processor 302 transmits electrical signals to operate the camera 306. The processor 302 may be operably coupled to one or more other devices (not shown).

The processor 302 is configured to process data and may be implemented in hardware or software. The processor 302 is configured to implement various instructions. For example, the processor 302 is configured to implement a virtual overlay engine 318, a voice recognition engine 320, a facial recognition engine 322, an object recognition engine 324, a gesture capture engine 326, a location engine 328, a biometric engine 330, and a request engine 332. In an embodiment, the virtual overlay engine 318, the voice recognition engine 320, the facial recognition engine 322, the object recognition engine 324, the gesture capture engine 326, the location engine 328, the biometric engine 330, and the request engine 332 are implemented using logic units, FPGAs, ASICs, DSPs, or any other suitable hardware.

The virtual overlay engine 318 is configured to overlay virtual objects onto tangible objects in a real scene using the display 308. For example, the display 308 may be a head-mounted display that allows a user to simultaneously view tangible objects in a real scene and virtual objects. The virtual overlay engine 318 is configured to process data to be presented to a user as an augmented reality virtual object on the display 308. An example of overlay virtual objects onto tangible objects in a real scene is shown in FIG. 2.

The voice recognition engine 320 is configured to capture and/or identify voice patterns using the microphone 314. For example, the voice recognition engine 320 is configured to capture a voice signal from a person and to compare the captured voice signal to known voice patterns or commands to identify the person and/or commands provided by the person. For instance, the voice recognition engine 320 is configured to receive a voice signal to authenticate a user and/or another person or to initiate a digital data transfer.

The facial recognition engine 322 is configured to identify people or faces of people using images or video streams created from a series of images. In one embodiment, the facial recognition engine 322 is configured to perform facial recognition on an image captured by the camera 306 to identify the faces of one or more people in the captured image. In another embodiment, the facial recognition engine 322 is configured to perform facial recognition in about real-time on a video stream captured by the camera 306. For example, the facial recognition engine 322 is configured to continuously perform facial recognition on people in a real scene when the camera 306 is configured to continuous capture images from the real scene. In some embodiments, customer 102 requests to speak with employee 104. AR user device 110 displays the employee's 104 location to customer 102. Customer 102 may navigate toward employee 104 and facial recognition engine 332 facilitates identifying employee 104. As another example, employee 104 may receive an alert to meet customer 102. Facial recognition engine 322 may facilitate identifying customer 102 and confirming customer's 102 identity before, e.g., sharing account information 134 with customer 102. The facial recognition engine 322 employs any suitable technique for implementing facial recognition as would be appreciated by one of ordinary skill in the art upon viewing this disclosure.

The object recognition engine 324 is configured to identify objects, object features, text, and/or logos using images or video streams created from a series of images. In one embodiment, the object recognition engine 324 is configured to identify objects and/or text within an image captured by the camera 306. In another embodiment, the object recognition engine 324 is configured to identify objects and/or text in about real-time on a video stream captured by the camera 306 when the camera 306 is configured to continuously capture image. The object recognition engine 324 employs any suitable technique for implementing object and/or text recognition as would be appreciated by one of ordinary skill in the art upon viewing this disclosure.

The gesture recognition engine 326 is configured to identify gestures performed by a user and/or other people. Examples of gestures include, but are not limited to, hand movements, hand positions, finger movements, head movements, audible gestures, and/or any other actions that provide a signal from a person. For example, gesture recognition engine 326 is configured to identify hand gestures provided by a user to indicate that the user executed a document. For example, the hand gesture may be a signing gesture associated with a stylus, a camera, and/or a data glove. The gesture recognition engine 326 employs any suitable technique for implementing gesture recognition as would be appreciated by one of ordinary skill in the art upon viewing this disclosure.

The biometric engine 330 is configured to identify a person based on a biometric signal 305 generated from the person's physical characteristics. The biometric engine 330 employs one or more biometric devices 317 to identify a user based on one or more biometric signals 305. For example, the biometric engine 330 receives a biometric signal 305 from the biometric device 317 in response to a retinal scan of the user's eye, a fingerprint scan of the user's finger, an audible voice capture, and/or a facial image capture. The biometric engine 330 compares biometric signals 305 from the biometric device 317 to previously stored biometric signals 305 for the user to authenticate the user. The biometric engine 330 authenticates the user when the biometric signals 305 from the biometric devices 317 substantially matches (e.g. is the same as) the previously stored biometric signals 305 for the user. In some embodiments, biometric engine 330 includes voice recognitions engine 320 and/or facial recognition engine 322.

Request engine 332 is configured to request information from central server 106, local server 126, and/or any other suitable component of system 100 and receive information in response to the request. Request engine 332 may employ network interface 312 to facilitate communicating requests and receiving information in response to the requests. Request engine 332 may generate a request to central server 106 for account information 134 and receive account information 134 in response to the request. Request engine may generate a request to central server 106 to receive institution information 152 and receive institution information 152 in response to the request. Request engine 332 may request to locate other users of system 100. For example, request engine 332 associate with customer 102 may communicate a request to local server 216 and/or AR user device 110b to locate employee 104.

The memory 304 comprises one or more disks, tape drives, or solid-state drives, and may be used as an over-flow data storage device, to store programs when such programs are selected for execution, and to store instructions and data that are read during program execution. The memory 304 may be volatile or non-volatile and may comprise ROM, RAM, TCAM, DRAM, and SRAM. The memory 304 is operable to store identification tokens 155, biometric signals 305, images 346 (e.g., images from camera 306), virtual overlay instructions 336, voice recognition instructions 338, facial recognition instructions 340, object recognition instructions 342, gesture recognition instructions 344, location instructions 346, biometric instructions 347, request instructions 348, and any other data or instructions.

Biometric signals 305 are signals or data that is generated by a biometric device 317 based on a person's physical characteristics. Biometric signal 305 are used by the AR user device 110 to identify and/or authenticate an AR user device 110 user by comparing biometric signals 305 captured by the biometric devices 317 with previously stored biometric signals 305.

Identification tokens 155 are generated by request engine 332 and sent to other AR user device 110, central server 106, local server 126, and/or any other suitable component of system 100. Identification tokens 155 may comprise any suitable information verifying a user's identity, including biometric data. In particular embodiments, identification tokens 155 are encoded or encrypted to obfuscate and mask information being communicated across a network. Masking the information being communicated protects users and their information in the event of unauthorized access to the network and/or data occurs.

The virtual overlay instructions 336, the voice recognition instructions 338, the facial recognition instructions 340, the object recognition instructions 342, the gesture recognition instructions 344, the location instructions 346, the biometric instructions 347, and the request instructions 348 each comprise any suitable set of instructions, logic, rules, or code operable to execute virtual overlay engine 318, the voice recognition engine 320, the facial recognition engine 322, the object recognition engine 324, the gesture recognition engine 326, the location engine 328, the biometric engine 330, and the request engine 332, respectively.

Figure 4:
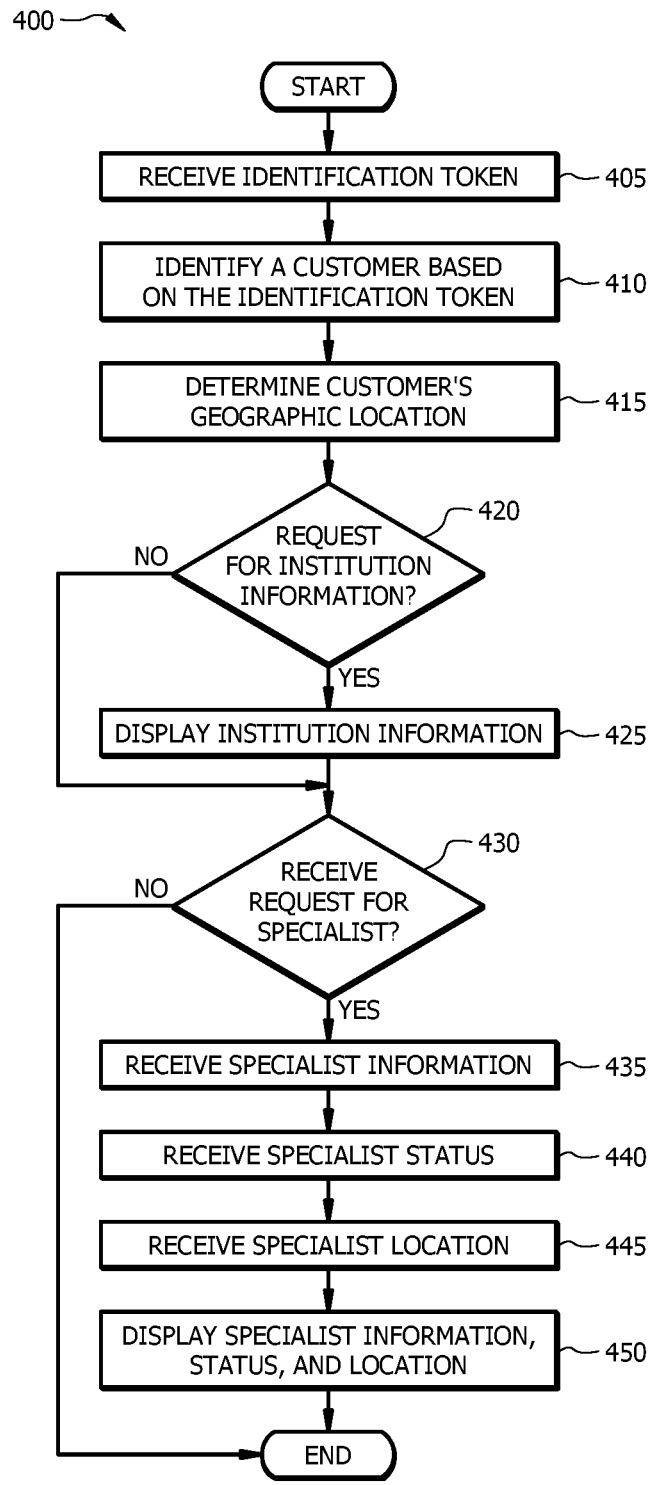
FIG. 4 is a flowchart of an embodiment of an augmented reality dynamic location determination method performed by an augmented reality user device.

FIG. 4 is an example method 400 of an augmented reality dynamic location determination method performed by an augmented reality user device. In some embodiments, customer 102 utilizes system 100 to perform method 400. The method starts at step 405 where central server 106 receives identification token 155 from AR user device 110a associated with customer 102. As previously discussed, AR user device 110a may verify a user's identity by receiving biometric data for the user and comparing the received biometric data to predetermined biometric data for the user. AR user device 110a generates identification token 155 in response to the identify verification. Central server 106 receives identification token 155 and determines customer 102 based on the identification token 155 at step 410. For example, identification token 155 includes customer's 102 identity, and central server 106 extracts the identity from identification token 155. AR user device 110a determines customer's 102 geographical location at step 415. As previously discussed, AR user device 110a may determine location using GPS 316 and/or beacon 334.

Central server 106 determines whether a request is received for institution information 136 at step 420. The request comprises the geographic location of customer 102. Central server 106 communicates institution information 135 to AR user device 110a based on the geographic location of customer 102. For example, if customer 102 is at or near an office of the institution, central server 106 may communicate institution information 136 associated with that office. Institution information may include information regarding employees of the offices including employees' names and specialties. If a request for institution information 136 is not received, the method proceeds to step 430, otherwise the method proceeds to step 425. AR user device 110 displays the received institution information 136 at step 425. For example, the information may be virtually overlaid in a real scene using contact card 202.

At step 430, central server 106 determines whether customer 102 requested a specialist. As discussed previously, each employee 104 may be associated with one or more specialties. Customer 102 may wish to communicate with an employee 104 that is associated with a particular specialty. If central server determines that customer 102 requested a specialist, the method proceeds to step 435, otherwise the method ends. At step 435, AR user device 110a receives specialist information. As discussed previously, institution information 136 may include specialist information. For example, a customer 102 may request to speak with an auto loan specialist. AR user device 110a may parse institution information 136 received at step 425 to determine each employee 102 that is an auto loan specialist. At step 440, AR user device 110a receives a status for each employee identified at step 435. The status may indicate whether each identified employee is available to speak with customer 102 as previously discussed.

At step 445, AR user device 110a retrieves specialist location information 152 from local server 126. If AR user device 110a determines that an identified specialist is available, AR user device 110a receives the geographic location of the available specialist. AR user device 110a displays the location of the specialist and identification for the specialist (e.g., the information discussed in relation to contact card 202) at step 450 as previously discussed before the method ends.

Modifications, additions, or omissions may be made to method 400 depicted in FIG. 4. Method 400 may include more, fewer, or other steps. For example, steps may be performed in parallel or in any suitable order. While discussed as specific components completing the steps of method 400, any suitable any suitable component of system 100 may perform any step of method 400.

Figure 5:
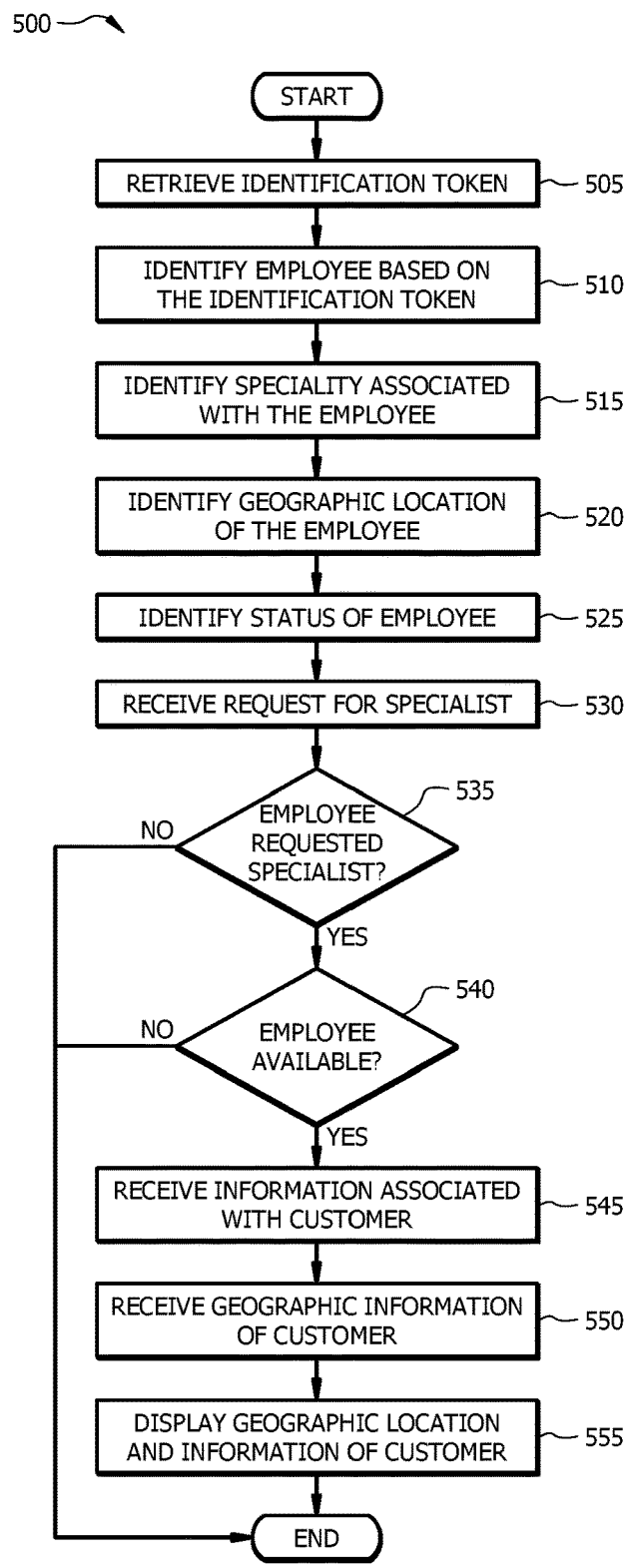
FIG. 5 is a flowchart of an embodiment of an augmented reality dynamic location determination method performed by an augmented reality user device.

FIG. 5 is an example method 500 of an augmented reality dynamic location determination method performed by an augmented reality user device. In some embodiments, employee 104 utilizes system 100 to perform method 500. The begins at step 505 where central server 106 receives identification token 155 from AR user device 110b associated with employee 104. As previously discussed, AR user device 110b may verify a user's identity by receiving biometric data for the user and comparing the received biometric data to predetermined biometric data for the user. AR user device 110b generates identification token 155 in response to the identify verification. Central server 106 receives identification token 155 and determines employee 104 based on the identification token 155 at step 510. For example, identification token 155 includes employee's 104 identity, and central server 106 extracts the identity from identification token 155. Central server 106 communicates institution information 136 to AR user device 110b after identifying employee 104.

AR user device 110b identifies one or more specialties associated with employee 104 at step 515. For example, AR user device 110b parses institution information 136 for employee 104 to determine one or more specialists associated with employee 104. AR user device 110b determines employee's 104 geographical location at step 520. As previously discussed, AR user device 110b may determine location using GPS 316 and/or beacon 334.

At step 525, AR user device 110b determines a status of employee 104. As previously discussed, employee 104 may manually set a status. As another example, employee's 104 calendar may indicate a status for employee 104. AR user device 110b receives a request for a specialist at step 530, and AR user device 110b determines whether employee 104 is a specialist of the requested specialty at step 535. If employee 104 is not a specialist of the requested specialty, the method ends. Otherwise, the method proceeds to step 540 where AR user device 110b determines whether employee 104 is available. For example, AR user device 110b uses the status determination of step 525 to determine whether employee 104 is available. If employee 104 is not available, the method ends. Otherwise, the method proceeds to step 545.

AR user device 110b receives information associated with customer 102 at step 525. For example, AR user device 110b receives contact card 202 for customer 102 and account information 134 for customer 102. AR user device 110b receives location information 152 for customer 102 from local server 126 at step 550, and displays the location of customer 102 for employee 104 at step 55 before the method ends.

Modifications, additions, or omissions may be made to method 500 depicted in FIG. 5. Method 500 may include more, fewer, or other steps. For example, steps may be performed in parallel or in any suitable order. While discussed as specific components completing the steps of method 500, any suitable any suitable component of system 100 may perform any step of method 500.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. An augmented reality system comprising:
a central server comprising:
account information for a first customer; and
institution information, the institution information comprising:
employee specialty data indicating one or more specialties of each of a plurality of employees of an institution; and
employee office data indicating an office of each of the plurality of employees, wherein each of the plurality of offices is are office of the institution and each office is geographically distinct;
a local server located at a first office of the plurality of offices comprising location information, the location information indicating a location of the first customer and a location of the plurality of employees of the first office;
an augmented reality user device for a first employee comprising:
a request engine implemented in hardware that:
receives a request from the first customer to communicate with the first employee, the request based on the specialty associated with the first employee and the location of the first employee;
a location engine implemented in hardware that:
receives at least part of the location information from the local server and determines the geographical location of the first customer using the location information; and
a display configured to:
overlay virtual objects onto tangible objects in real-time;
display at least part of the account information; and
generate a virtual overlay of the location of the first customer.

2. The augmented reality system of claim 1, wherein the request engine determines an availability of the first employee and retrieves the request from the first customer upon a determination that the first employee is available.

3. The augmented reality system of claim 1, wherein the display is further configured to display an image of the first customer.

4. The augmented reality system of claim 1, wherein the augmented reality user device is further configured to communicate location information to the local server based on information received from one of a global positioning system ("GPS") sensor and a beacon.

5. The augmented reality system of claim 1, farther comprising:
a biometric engine implemented in hardware that:
receives biometric data for the first customer; and
confirms the first customer's identity by comparing the received biometric data for the first customer to predetermined biometric data for the first customer.

6. The augmented reality system of claim 1, wherein the augmented reality user device further comprises a facial recognition engine implemented in hardware that performs facial recognition to identify a face of the requested employee and confirms the requested employee's identity using the facial recognition.

7. The augmented reality system of claim 1, wherein the account information for the first customer indicates a type of account that the first customer has with the institution and a balance of the account.

8. An augmented reality digital data transfer method comprising:
storing, at a central server, account information for a first customer;
storing, at the central server, institution information, the institution information comprising:
employee specialty data indicating one or more specialties of each of a plurality of employees of an institution; and
employee office data indicating an office of each of the plurality of employees, wherein each of the plurality of offices is an office of the institution and each office is geographically distinct;
storing, at a local server located at a first office of the plurality of offices, location information, the location information indicating a location of the first customer and a location of the plurality of employees of the first office;
receiving a request from the first customer to communicate with the first employee, the request based on the specialty associated with the first employee and the location of the first employee;
receiving at least part of the location information from the local server and determining the geographical location of the first customer using the location information;
overlaying virtual objects onto tangible objects in real-time;
displaying at least part of the account information; and
generating a virtual overlay of the location of the first customer.

9. The method of claim 8, further comprising determining an availability of the first employee and generating the request to retrieve specialties associated with the first employee upon a determination that the first employee is available.

10. The method of claim 8, further comprising displaying an image of the first customer.

11. The method of claim 8, further comprising communicating location information based on information received from one of a global positioning system ("GPS") sensor and a beacon.

12. The method of claim 8, further comprising:
receiving biometric data for the first customer; and
confirming the first customer's identity by comparing the received biometric data for the first customer to predetermined biometric data for the first customer.

13. The method of claim 8, further comprising performing facial recognition to identify a face of the requested employee and confirming the requested employee's identity using the facial recognition.

14. The method of claim 8, wherein the account information for the first customer indicates a type of account that the first customer has with the institution and a balance of the account.

15. An augmented reality user device comprising:
a request engine implemented in hardware that:
receives a request from a first customer to communicate with a first employee, the request based on a specialty associated with the first employee and a location of the first employee;
a location engine in implemented in hardware that:
receives location information from a local server and determines the geographical location of the first employee using the location information, wherein the location information indicates the location of the first customer and a location of a plurality of employees of a first office of a plurality of offices, wherein each of the plurality of offices is an office of the institution and each office is geographically distinct; and a display configured to:
overlay virtual objects onto tangible objects in real-time;
display account information for the first customer; and
generate a virtual overlay of the location of the first customer.

16. The augmented reality user device of claim 15, wherein the request engine determines an availability of the first employee and generates the request to retrieve specialties associated with the first employee upon a determination that the first employee is available.

17. The augmented reality user device of claim 15, wherein the display is further configured to display an image of the first customer.

18. The augmented reality user device of claim 15, further comprising:
a biometric engine implemented in hardware that:
receives biometric data for a first employee of a plurality of employees; and
confirms the first employee's identity by comparing the received biometric data for the first employee to predetermined biometric data for the first employee.

19. The augmented reality user device of claim 15, further configured to communicate location information to the local server based on information received from one of a global positioning system ("GPS") sensor and a beacon.

20. The augmented reality user device of claim 15, wherein the augmented reality user device further comprises a facial recognition engine implemented in hardware that performs facial recognition to identify a face of the requested employee and confirms the requested employee's identity using the facial recognition.

* * * * *

UNITED STATES PATENT AND TRADEMARK OFFICE
CERTIFICATE OF CORRECTION

PATENT NO. : 10,109,096 B2
APPLICATION NO. : 15/372964
DATED : October 23, 2018
INVENTOR(S) : Joseph N. Johansen Page 1 of 1

It is certified that error appears in the above-identified patent and that said Letters Patent is hereby corrected as shown below:

In the Claims

Column 19, Line 55, delete "farther", insert --further--.

Signed and Sealed this
Seventeenth Day of September, 2019

Andrei Iancu
*Director of the United States Patent and Trademark Office*